United States Patent [19]

Tomforde

[11] Patent Number: 4,770,457
[45] Date of Patent: Sep. 13, 1988

[54] LOWERABLE UNDERFLOOR PANEL FOR THE FRONT END OF MOTOR VEHICLES

[75] Inventor: Johann Tomforde, Sindelfingen, Fed. Rep. of Germany

[73] Assignee: Daimler-Benz Aktiengesellschaft, Stuttgart, Fed. Rep. of Germany

[21] Appl. No.: 38,627

[22] Filed: Apr. 15, 1987

[30] Foreign Application Priority Data

Apr. 19, 1986 [DE] Fed. Rep. of Germany ....... 3613303

[51] Int. Cl.$^4$ ...................... B62D 35/02; B62D 37/02
[52] U.S. Cl. ..................................... 296/1 S; 293/117
[58] Field of Search ................. 296/1 S, 91; 293/117

[56] References Cited

U.S. PATENT DOCUMENTS

| 3,929,202 | 12/1975 | Hobbensiefken | 296/1 S X |
| 4,049,309 | 9/1977 | Seal | 296/1 S |
| 4,119,339 | 10/1978 | Heimburger | 296/1 S |
| 4,131,308 | 12/1978 | Holka et al. | 296/1 S |
| 4,386,801 | 6/1983 | Chapman et al. | 296/1 S |
| 4,398,764 | 8/1983 | Okuyama | 293/117 X |
| 4,457,558 | 7/1984 | Ishikawa | 296/1 S |
| 4,569,551 | 2/1986 | Rauser et al. | 296/1 S |

FOREIGN PATENT DOCUMENTS

| 2616948 | 12/1979 | Fed. Rep. of Germany | 296/1 S |
| 2827834 | 1/1980 | Fed. Rep. of Germany | 296/1 S |
| 3132341 | 3/1983 | Fed. Rep. of Germany . | |
| 3239946 | 5/1984 | Fed. Rep. of Germany | 296/1 S |
| 1419497 | 12/1975 | United Kingdom | 296/1 S |

*Primary Examiner*—Robert B. Reeves
*Assistant Examiner*—Russell D. Stormer
*Attorney, Agent, or Firm*—Barnes & Thornburg

[57] ABSTRACT

An aerodynamic underfloor panel for the front end region of motor vehicles is disclosed. The panel includes an elastically deformable plate attached at its rear end behind the front wheel casings of the vehicle body and moveably guided at its front end by a guide arrangement disposed at a front bumper skirt. An hydraulically actuated adjusting mechanism is provided which includes a stirrup engaging the top side of the plate to bend the plate downwardly toward the roadway at high vehicle speeds to thereby decrease the aerodynamic lift. During the elastic bending of the plate, the front end of the plate is moved longitudinally of the vehicle along its guide support of the front bumper skirt.

9 Claims, 1 Drawing Sheet

LOWERABLE UNDERFLOOR PANEL FOR THE FRONT END OF MOTOR VEHICLES

BACKGROUND AND SUMMARY OF THE INVENTION

The present invention relates to an aerodynamic underfloor panel lowerable towards a roadway and intended primarily for the front end of motor vehicles.

An underfloor panel of this general type is known from German Published Unexamined Patent Application No. 3,132,314. In that reference, the front skirt of a motor vehicle is pivoted towards the roadway, in order to obtain lower flow resistances along the vehicle bottom at higher speeds. However, as a result of an opening into the engine space occurring at the front when the front skirt is lowered, a design of this type must allow for additional unfavorable cooling-air influences to be controlled and for air vortices having an increasing effect on the drag coefficient which arise in the engine space under various driving conditions.

An object of the present invention is, therefore, to provide an underfloor panel lowerable towards the roadway and intended for the front end of motor vehicles such that the flow conditions in the engine space remain the same when the underfloor panel is in different lowering positions.

Because the underfloor panel is elastically deformed, while at the same time the transition to the front body parts, which is closed over the entire surface, is maintained, the position of the underfloor panel can be matched to the prevailing driving conditions without the occurrence of additional undesirable airflow influences which would have to be compensated again by means of new control operations.

Other objects, advantages and novel features of the present invention will become apparent from the following detailed description of the invention when considered in conjunction with the accompanying drawings.

DETAILED DESCRIPTION OF THE DRAWINGS

Figure 1:
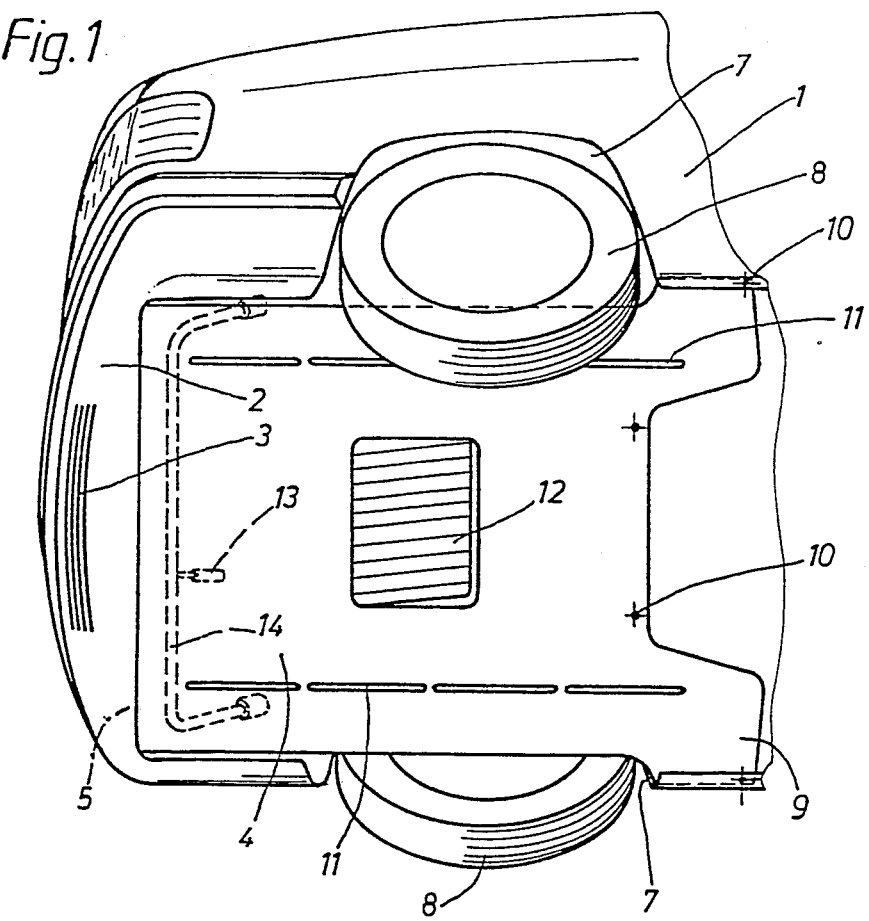
FIG. 1 shows a bottom view of the front region of a motor vehicle with a preferred embodiment of the present invention.

FIG. 1 shows a front region 1 of a body of a motor vehicle terminating in a bumper skirt 2 which is equipped, in its middle region, with transverse air inlet slits 3. A plate 4 forms a lowerable underfloor and is preferably made of flexible plastic, such as modified polypropylene oxide or modified polycarbonate.

The plate 4 rests displaceably, by means of its end region 5 at the front of the vehicle, inside the bumper skirt 2 on a rest 6 (FIG. 2) extending transversely to the longitudinal axis of the vehicle. In the illustrated preferred embodiment, the rest 6 is formed by a rotatable roller. The plate 4 is continued in the form of a shell to the area behind the wheel cases 7 of the front wheels 8, where it is fixed in its rear end region 9 to the vehicle by means of screws 10, for example. The plate 4 thus makes a transition to the bumper skirt 2 which is closed on the onflow side.

The stability of the plate 4 is increased by beads 11 extending in the longitudinal direction and interrupted several times at equal intervals, in order to ensure sufficient flexibility and bending which is uniform over the width of the plate 4. In the middle region of plate 4 is a cooling-air orifice 12, through which cooling air is introduced into the engine space located above in order to improve the engine cooling.

Figure 2:
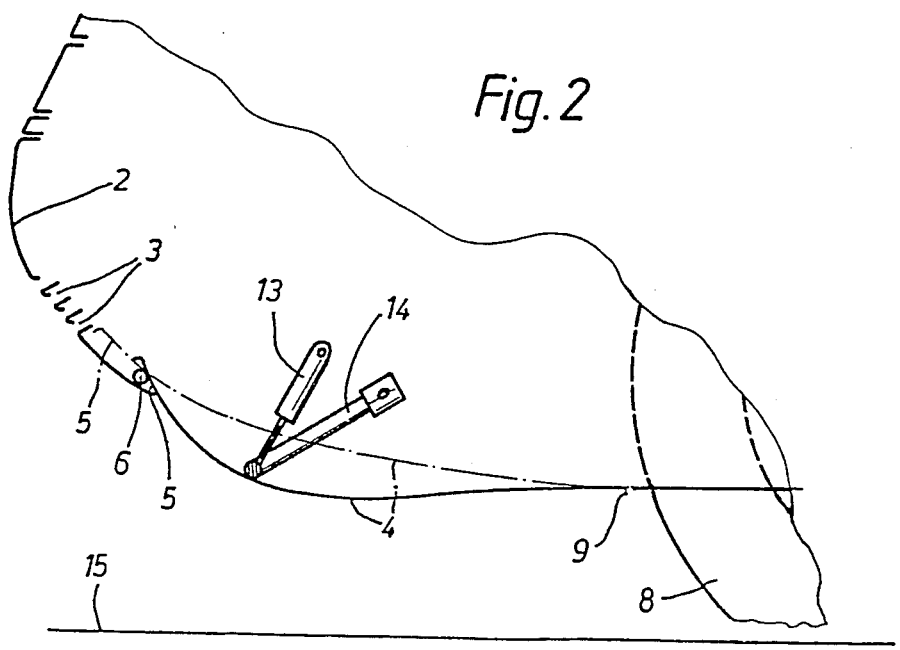
FIG. 2 shows, in a basic diagram, a side view of the front region of a motor vehicle with the preferred embodiment of the underfloor panel lowered.

In FIG. 2, the plate 4 is represented by a dot-and-dash line in the upper position and by an unbroken line in the lowered position. When the driving speed increases, plate 4 is bent by exerting force on a transverse, pivotably mounted tubular stirrup 14 controlled by a feed unit 13, which is controlled by a conventional hydraulic circuit, for example, not illustrated. At the same time, the plate 4 maintains its closed transition at the front of the bumper skirt 2.

When lowered, plate 4 forms with a roadway 15 a narrowed cross-section which, because of its air-accelerating effect, results in less lift and therefore greater force on the front wheels 8.

The present invention also embraces a plate of this kind which already in its upper position has a shape bent aerodynamically at the front and which is matched to the particular driving conditions by being bent further.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An aerodynamic panel arrangement for motor vehicles, comprising:
    an inherently rigid, elastically deformable plate which is fixed to said vehicle in a first end region of said plate located in the longitudinal direction of said vehicle;
    rest means fixed to said vehicle and extending in a transverse direction of said vehicle for displaceably supporting a second end region opposite to said first end region in the longitudinal direction; and
    adjusting means mounted on the vehicle for bulging a portion of said plate downwards towards a vehicle supporting roadway with movement of said second end region in the vehicle longitudinal direction along said rest means to accommodate said bending, whereby a narrowed cross-section is formed between the roadway and the bulged portion of said plate with consequent decrease in lift due to air flowing under the plate during vehicle driving conditions.

2. An underfloor panel arrangement according to claim 1, wherein said first end region is a rear end region and said second end region is a front end region, and wherein said plate is slideably guided in the rest means in said front end region and is fixedly fastened in said rear end region.

3. An underfloor panel arrangement according to claim 2, wherein said rest means is a roller.

4. An underfloor panel arrangement according to claim 1, further comprising discontinuous beads in said longitudinal direction of the vehicle on a surface of said plate.

5. An underfloor panel arrangement according to claim 1, wherein said rest means is a roller.

6. An underfloor panel arrangement according to claim 1, further comprising a cooling-air orifice in said plate for introducing cooling air into an engine space of said vehicle.

7. An underfloor panel arrangement according to claim 1, wherein said first end region is disposed behind wheel case means for front wheels of a vehicle, and wherein said second end region is disposed in overlapping relationship with a front vehicle bumper skirt.

8. An underfloor panel arrangement according to claim 7, wherein said rest means is a roller disposed behind the bumper skirt, said roller guidably engaging a bottom side of said plate.

9. An underfloor panel arrangement according to claim 8, wherein said adjusting means includes a moveable stirrup engageable with a top surface of said plate and hydraulic actuating means for moving said stirrup to bend said plate downwardly during increased vehicle driving speeds.

* * * * *